United States Patent [19]
Biefeld et al.

[11] 3,946,131
[45] Mar. 23, 1976

[54] GLASS FIBERS COATED WITH SILICON CONTAINING AMINIMIDE COMPOUNDS

[75] Inventors: Lawrence P. Biefeld, Toledo; Kevin M. Foley, Hebron; Frank Paul McCombs, Granville, all of Ohio

[73] Assignee: Owens-Corning Fiberglas Corporation, Toledo, Ohio

[22] Filed: May 6, 1974

[21] Appl. No.: 467,313

[52] U.S. Cl. ............... 428/378; 57/140 G; 57/153; 260/3; 260/37 R; 260/42.15; 260/429 R; 260/429.7; 260/440; 260/446; 260/448 A; 260/448.2 N; 260/448.8 R; 260/558 H; 260/561 H; 428/292; 428/295; 428/391; 428/392
[51] Int. Cl.² .................. B32B 17/04; C07F 7/18
[58] Field of Search ......... 117/126 GS, 126 GN, 72; 260/448.2 N, 448.8 R, 561 H, 558 H, 3, 42.15, 37 R; 428/292, 295, 378, 391, 392; 57/140 G, 153

[56] References Cited
UNITED STATES PATENTS

| | | | |
|---|---|---|---|
| 2,946,701 | 7/1960 | Plueddemann | 117/126 GS |
| 2,950,986 | 8/1960 | Bailey | 260/448.2 N |
| 2,953,570 | 9/1960 | Rudner | 260/561 H |
| 2,955,108 | 10/1960 | Omietouski | 260/583 B |
| 2,972,598 | 2/1961 | Morehouse | 260/448.2 N |
| 3,032,577 | 5/1962 | Morehouse | 260/448.2 N |
| 3,215,718 | 11/1965 | Ryan | 260/448.2 N |
| 3,259,518 | 7/1966 | Sterman | 260/448.2 N |
| 3,373,137 | 3/1968 | Soam | 260/448.2 N |
| 3,555,051 | 1/1971 | Marsden | 260/448.8 R |
| 3,555,095 | 1/1971 | Slagel | 260/584 R |
| 3,561,996 | 2/1971 | Young | 117/72 |
| 3,565,868 | 2/1971 | Sedor | 260/78.3 |
| 3,580,920 | 5/1971 | Culpepper | 260/448.2 N |
| 3,637,779 | 1/1972 | Le Grow | 260/448.2 N |
| 3,700,711 | 10/1972 | Berger | 260/448.8 R |
| 3,706,797 | 1/1972 | McKillip | 260/558 H |
| 3,706,800 | 12/1972 | Hortlage | 260/558 H |
| 3,715,343 | 2/1973 | Slagel | 260/88.1 PN |
| 3,734,763 | 5/1973 | Plueddemann | 117/126 GN |
| 3,756,994 | 9/1973 | Culbertson | 260/82.1 |

OTHER PUBLICATIONS

"Aminimides Show Broad Commercial Potential" in *Chemical & Engineering News*, Vol. 51, Apr. 2, 1973, pp. 11-12.

*Primary Examiner*—Ralph Husack
*Assistant Examiner*—William H. Schmidt
*Attorney, Agent, or Firm*—John W. Overman; Keith V. Rockey

[57] ABSTRACT

Organo silicon compounds having the formula

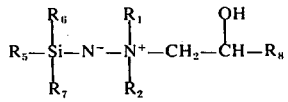

wherein $R_1$ and $R_2$ are alkyl, $R_5$ is a hydrocarbon group or an unsaturated ester group, $R_6$ and $R_7$ are alkoxy, $R_5$ or hydrogen, and $R_8$ is hydrogen or an organic group such as hydrogen, alkyl or a group of the formula

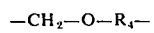

where $R_4$ is aryl, alkyl, alkenyl or a group of the formula

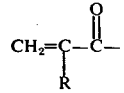

where R' is hydrogen or methyl. The compounds of this invention are prepared by reaction of a dialkyl hydrazine with an epoxide in the presence of an organo silicon compound and are used as coupling agents in the treatment of glass fibers. Also disclosed are glass fibers coated with aminimide compounds containing aluminum, gallium, phosphorus, arsenic, antimony, boron, germanium or tin.

13 Claims, No Drawings

GLASS FIBERS COATED WITH SILICON CONTAINING AMINIMIDE COMPOUNDS

This invention relates to aminimides, and more particularly to aminimide derivatives of hydrolyzable metal and metalloid compounds.

In the April, 1973 edition of Chemical and Engineering News, there is described a reaction for producing aminimides by reaction of a dialkyl hydrazine with an epoxide in the presence of a carboxylic acid ester. As is described in the publication, the reaction between the epoxide and the dialkyl hydrazine proceeds in accordance with the following:

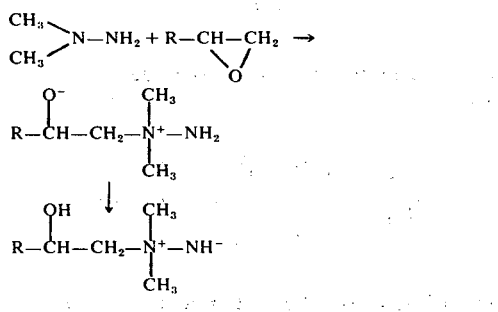

which in turn reacts with the ester present in accordance with the following:

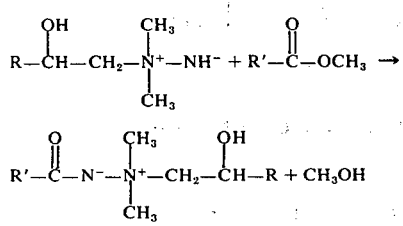

It has now been found that the above procedure can be used to prepare aminimide derivatives of compounds of various metals and metalloids.

It is an object of the present invention to provide aminimide derivatives of various metals and metalloid compounds, and it is another object of the invention to provide aminimide derivatives for use as coupling agents for bonding glass fibers to plastic resins and elastomeric materials.

It is a more specific object of the invention to provide aminimide derivatives of boron, aluminum, gallium, germanium, tin, phosphorus, astatine, antimony, and preferably silicon, and to provide glass fibers treated with same.

One of the concepts of the present invention resides in the discovery that a dialkyl hydrazine is capable of reaction with an epoxide in the presence of an organo silicon compound containing at least one alkoxy group to form an aminimide derivative of the organo silicon compound. The resulting aminimide derivatives of the organo silicon compounds can be used as coupling agents to bond polyester fibers, glass fibers and the like to elastomeric materials and thermosetting resins.

The reaction of the present invention is carried out by contacting a dialkyl hydrazine with an epoxide in the presence of the organo silicon compound. In carrying out the reaction, use is made of a dialkyl hydrazine of the formula

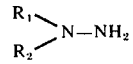

wherein $R_1$ and $R_2$ are each selected from alkyl containing 1 to 6, and preferably 1 to 3, carbon atoms (e.g., methyl, ethyl, propyl, isopropyl, etc.), an epoxide and an organo silicon compound.

Preferred epoxides for use in the practice of this invention are epoxides of the formula

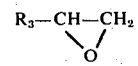

wherein $R_3$ is hydrogen or $C_1$ to $C_8$ alkyl (e.g., methyl, ethyl, propyl, etc.), or epoxides of the formula

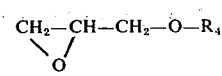

wherein $R_4$ is an aryl group, such as phenyl or phenyl substituted with an amino group, a halogen group, an alkyl group; alkyl containing 1 to 20 carbon atoms and substituted derivatives thereof; an alkenyl group containing 2 to 8 carbon atoms (e.g., vinyl, allyl, etc.); styrene oxide; a group having the formula

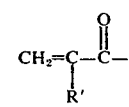

wherein $R'$ is hydrogen or methyl. Illustrative of such epoxides are phenyl glycidyl ether, cresyl glycidyl ether, allyl glycidyl ether, glycidyl acrylate, glycidyl methacrylate, a mixture of n-octyl and n-decyl glycidyl ethers (Epoxide No. 7 from Procter and Gamble), and a mixture of n-dodecyl and n-tetradecyl glycidyl ethers (Epoxide No. 8 from Procter and Gamble).

The reaction thus proceeds as follows:

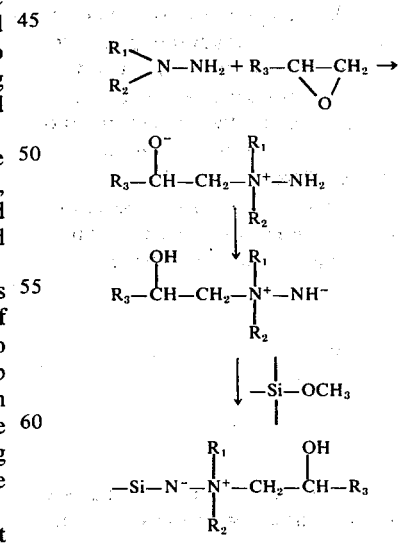

A number of organo silicon compounds may be used in the practice of this invention. Preferred compounds are those having the formula

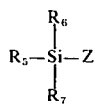

wherein $R_5$ is a monovalent organic group containing 1 to 20 carbon atoms. Representative of such groups are $C_1$ to $C_{12}$ alkyl (e.g., methyl, ethyl, propyl, butyl, isobutyl, pentyl, decyl, etc.); aryl containing 6 to 12 carbon atoms including phenyl, tolyl, naphthyl, etc.; cycloalkyl containing 4 to 7 carbon atoms (e.g., cyclopentyl, cyclohexyl, etc.), or alkenyl containing 2 to 6 carbon atoms (e.g., vinyl, allyl, etc.). $R_5$ can also be a $C_3$ to $C_6$ acryloxy or methacryloxyalkyl group (e.g., methacryloxypropyl). Z is an alkoxy group containing 1 to 5 carbon atoms (e.g., methoxy, ethoxy, propoxy, etc.). $R_6$ and $R_7$ can each be selected from the group of alkoxy as described for Z or an $R_5$ group, or hydrogen.

Illustrative of such silanes are:
methyltrimethoxy silane
ethyltriethoxy silane
butyltriethoxy silane
n-octadecyltrimethoxy silane
dimethyldimethoxy silane
trimethylethoxy silane
n-propyldimethoxy silane
phenylmethyldimethoxy silane
phenyltriethoxy silane
tolyldimethoxy silane
triphenylmethoxy silane
cyclohexyltriethoxy silane
cyclopentylethyldimethoxy silane
vinyltrimethoxy silane
allyltrimethoxy silane
vinylethylmethoxy silane
allylmethyldimethoxy silane The reaction can be carried out by contacting the reactants at room temperature although higher or lower temperatures can be employed. For example, temperatures within the range of 10° to 120°C may be employed. The reaction can be carried out in the presence of an inert organic solution such as a hydrocarbon solvent or the like, with the liquid reactants generally serving as the reaction medium without the need to employ such solvents. The proportions of the reactants are not critical to the practice of the invention and generally, stoichiometric proportions are preferred. However, use can be made of from 0.7 to 1.4 moles of the dialkyl hydrazine per mole of the silane, and 0.8 to 1.2 moles of the epoxide per mole of the organo silane.

The compounds of the invention have the general formula

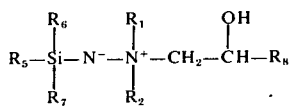

wherein $R_1$, $R_2$, $R_5$, $R_6$ and $R_7$ have the meaning set forth above, and $R_8$ is the residue of the epoxy compound, either $R_3$ or

—$CH_2$—O—$R_4$ as described above.

Examples of compounds prepared in accordance with this concept include:

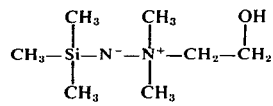

Trimethylmethoxy silane; dimethyl hydrazine; ethylene oxide.

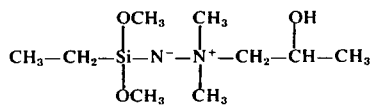

Ethyltrimethoxy silane; dimethyl hydrazine; propylene oxide.

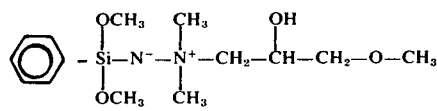

Phenyltrimethoxy silane; dimethyl hydrazine; glycidyl methyl ether.

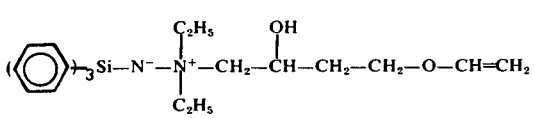

Triphenylethoxy silane; diethyl hydrazine; vinyl glycidyl ether.

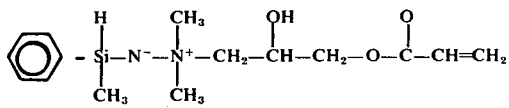

Phenylmethylmethoxy silane; dimethyl hydrazine; glycidyl acrylate.

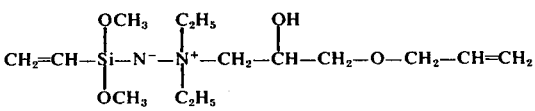

Vinyl trimethoxy silane; diethyl hydrazine; allyl glycidyl ether.

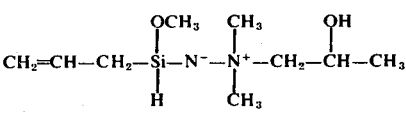

Allyl dimethoxy silane; dimethyl hydrazine; propylene oxide.

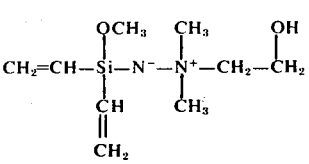

Bis(vinyl)dimethoxy silane; dimethyl hydrazine; ethylene oxide.

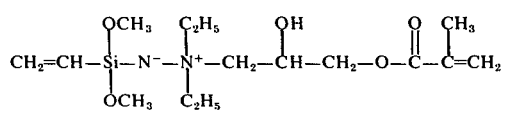

Vinyltrimethoxy silane; diethyl hydrazine; glycidyl methacrylate.

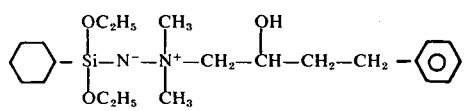

Cyclohexyltriethoxy silane; dimethyl hydrazine; styrene oxide.

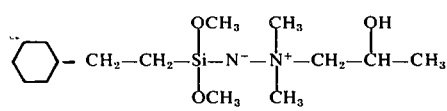

Cyclohexylethyltrimethoxy silane; dimethyl hydrazine; propylene oxide.

While not equivalent to the aminimides derived from organo silicon compounds described above, it has also been found that alkoxides of various polyvalent elements can also be used to prepare the corresponding compounds. For example, use can be made of organo derivatives of trivalent elements having the formula $$(R_9)_x M(OR_{10})_{3-x}$$

wherein $R_9$ is a monovalent organic group such as alkyl containing 1 to 8 carbon atoms (e.g., methyl, ethyl, isopropyl, butyl, etc.), aryl containing 6 to 12 carbon atoms such as phenyl, naphthyl, tolyl, etc., alkenyl containing 2 to 6 carbon atoms (e.g., vinyl, allyl, etc.) or cycloalkyl containing 4 to 7 carbon atoms (e.g., cyclopentyl, cyclohexyl, etc.); M is a trivalent element selected from aluminum, gallium, phosphorus, arsenic, antimony and boron; $x$ is an integer from 1 to 2 and $R_{10}$ is alkyl containing 1 to 6 carbon atoms (e.g., methyl, ethyl, propyl, isopropyl, butyl, etc.).

Illustrative of such compounds include:

$CH_3Al(OCH_3)_2$ $(CH_3-CH_2-)_2Al(OCH_3)$

$CH_2=CH-Al(OCH_3)_2$ $(CH_3-CH_2-)_2Ga(OC_2H_5)$

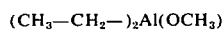
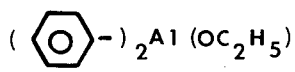

$CH_3-CH_2-CH_2-P(OCH_3)_2$

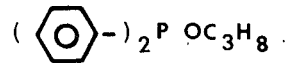

$CH_2=CH-CH_2-P(OCH_3)_2$ $CH_3-(CH_2)_4-As(OCH_3)$

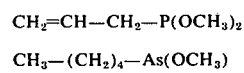

$CH_2=CH-As(OCH_3)_2$ $CH_3-Sb(OCH_3)_2$

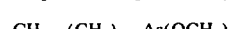

$CH_2=CH-CH-Sb(OC_2H_5)_2$ $CH_3-(CH_2)_4-B(OCH_3)_2$

$(CH_3-)_2B(OC_2H_5)$

The foregoing alkoxy compounds react with a dialkyl hydrazine and an epoxide as described to give generally analogous products. These products have the formula:

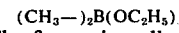

where $R_1$, $R_2$, $R_8$, $R_9$, $R_{10}$ and $x$ have the meanings set forth above.

Illustrative of compounds which can be prepared with this concept of the invention include:

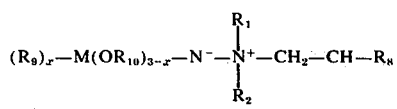

Diethylmethoxy aluminum; dimethyl hydrazine; propylene oxide.

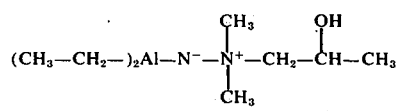

Phenyldimethoxy aluminum; diethyl hydrazine; vinyl glycidyl ether.

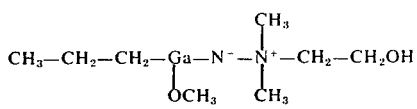

Propyldimethoxy gallium; dimethyl hydrazine; ethylene oxide.

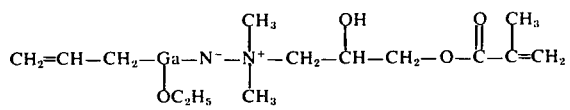

allyldiethoxy gallium; dimethyl hydrazine; glycidyl methacrylate.

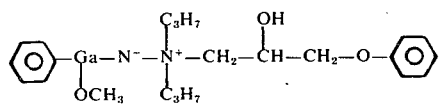

Phenyldimethoxy gallium; dipropyl hydrazine; phenyl glycidyl ether.

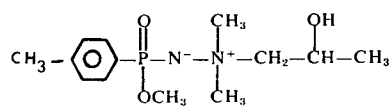

Cresyldimethylphosphate; dimethyl hydrazine; propylene oxide.

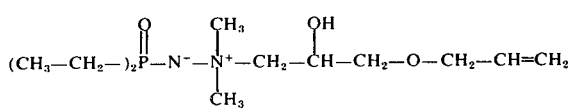

Diethylmethylphosphate; dimethyl hydrazine; allyl glycidyl ether.

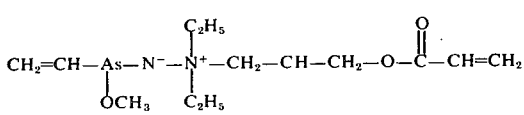

vinyldimethoxy arsenic; diethyl hydrazine; glycidyl acrylate.

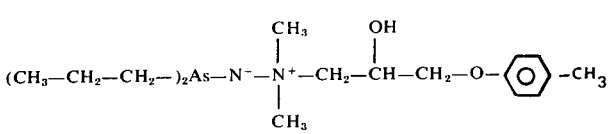

Bis(propyl)methoxy arsenic; dimethyl hydrazine; cresyl glycidyl ether.

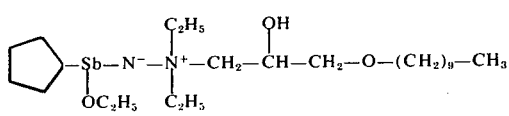

Cyclopentyldiethoxy antimony; diethyl hydrazine; n-decyl glycidyl ether.

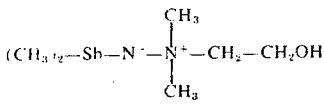

Dimethylmethoxy antimony; diethyl hydrazine; ethylene oxide.

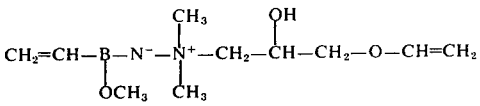

Vinyldimethylborane; dimethyl hydrazine; vinyl glycidyl ether.

In addition to the foregoing trivalent alkoxides, use can be made of tetravalent alkoxides of germanium or tin; these alkoxides have the formula $$(R_9)_y M'(OR_{10})_{4-y}$$

wherein $R_9$ and $R_{10}$ are as described above, M' is germanium or tin and $y$ is an integer from 1 to 3.

Representative compounds include $(CH_3)_2 Ge(OC_2H_5)_2$ $CH_2=CH-CH_2 - Ge(OCH_3)_3$

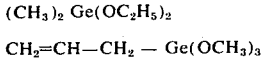

$(CH_3-CH_2)_2 Sn(OCH_3)_2$ $CH_2=CH - Sn(OC_2H_5)_3$

The foregoing alkoxide compounds similarly react with a dialkyl hydrazine and an epoxide to provide compounds of the general formula

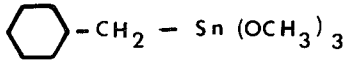

wherein $R_1$, $R_2$, $R_9$, $R_{10}$, M' and Y have the meanings as described above. y Representative compounds which can be prepared in accordance with this concept of the invention include the following:

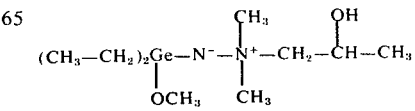

Diethyldimethoxy germanium; dimethyl hydrazine; propylene oxide.

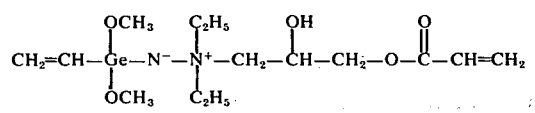

Vinyltrimethoxy germanium; diethyl hydrazine; glycidyl acrylate.

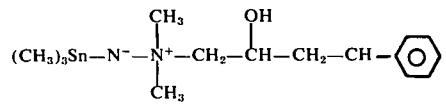

Trimethylmethoxy tin; dimethyl hydrazine; styrene oxide.

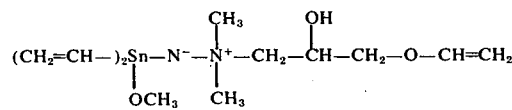

Divinyldimethoxy tin; dimethyl hydrazine; vinyl glycidyl ether.

Having described the essential concepts of the present invention, reference is now made to the following examples which are provided by way of illustration, and not of limitation, of the practice of this invention in the preparation of the organo silicon compounds and their use in the treatment of glass fibers.

EXAMPLE 1

Into a round bottom flask equipped with a thermometer, a stirrer, a reflux condenser and an addition funnel, 1 mole of triphenylmethoxy silane, 1 mole of dimethyl hydrazine, and 1 mole of n-butyl glycidyl ether are added. The reaction mixture is maintained at 80°C for 4 hours after which any unreacted materials present are separated.

The product is found to have the formula

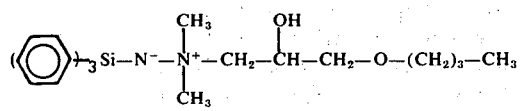

EXAMPLE 2

Using the procedure as described in Example 1, 1 mole of tri(n-propyl)methoxy silane is reacted with 1 mole of dimethyl hydrazine and 1 mole of allyl glycidyl ether. The product is found to have the formula

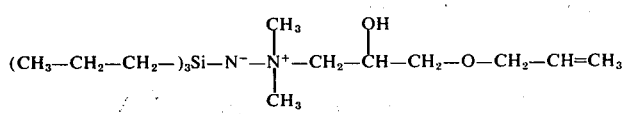

EXAMPLE 3

Using the procedure as described in Example 1, 1.1 mole of vinyltrimethoxy silane is reacted with 1 mole of diethyl hydrazine and 1.9 mole of glycidyl methacrylate. The product of the reaction is found to have the formula

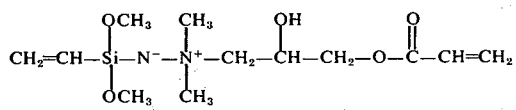

EXAMPLE 4

Using the procedure as described in Example 1, 1 mole of octadecyltrimethoxy silane is reacted with 1 mole of dimethyl hydrazine and 1 mole of cresyl glycidyl ether. The product of the reaction is found to have the formula

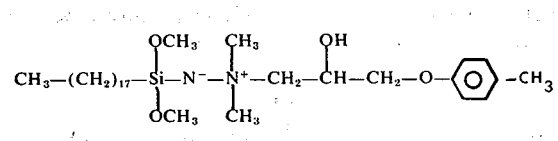

EXAMPLE 5

Again using the procedure as described in Example 1, 1 mole of trimethylmethoxy silane is reacted with 1 mole of diethyl hydrazine and 1 mole of propylene oxide. The product of the reaction is found to have the formula

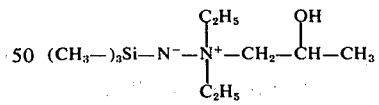

EXAMPLE 6

Using the procedure as described in Example 1, 1 mole of triphenylmethoxy silane is reacted with 1 mole of dimethyl hydrazine and 1 mole of glycidyl methacrylate. The product of the reaction is found to have the formula

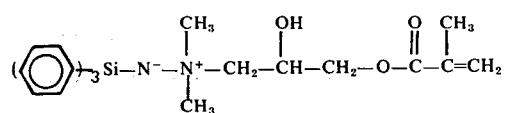

EXAMPLE 7

Using the procedure described in Example 1, 1 mole of diphenylmethoxy boron is reacted with 1 mole of dimethyl hydrazine and 1 mole of phenyl glycidyl ether. The product separated from the reaction mixture is found to have the formula

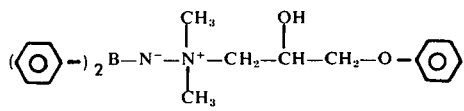

EXAMPLE 8

Using the procedure described in Example 1, 1 mole of di(n-pentyl)methoxy aluminum is reacted with 1 mole of dimethyl hydrazine and 1 mole of nonyl glycidyl ether. The product of the reaction is found to have the formula

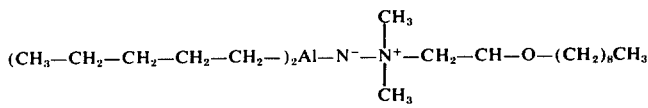

EXAMPLE 9

Using the procedure described in Example 1, 1 mole of trimethoxy gallium is reacted with 1 mole of dimethyl hydrazine and 1 mole of allyl glycidyl ether. The product is found to have the formula

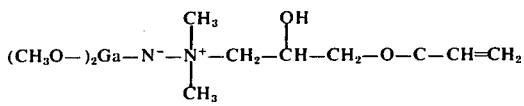

EXAMPLE 10

Using the procedure described in Example 1, 1 mole of tetraethoxy germanium is reacted with 1 mole of dimethyl hydrazine and 1 mole of glycidyl acrylate. The reaction product is found to have the formula

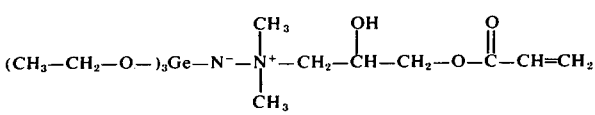

EXAMPLE 11

Using the procedure described in Example 1, 1 mole of tetramethoxy tin is reacted with 1 mole of dimethyl hydrazine and 1 mole of glycidyl methacrylate. The reaction product is found to have the formula

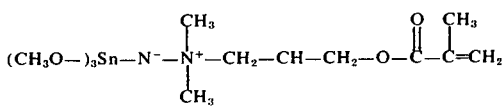

EXAMPLE 12

Using the procedure described in Example 1, 1 mole of diphenylmethoxyphosphine is reacted with 1 mole of dimethyl hydrazine and 1 mole of cresyl glycidyl ether. The product of the reaction is found to have the formula

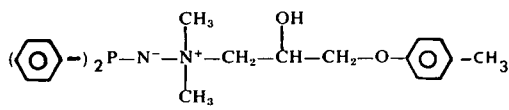

EXAMPLE 13

Using the procedure as described in Example 1, 1 mole of di(n-propyl)methoxy arsenic is reacted with 1 mole of diethyl hydrazine and 1 mole of propylene oxide. The product of the reaction is found to have the formula

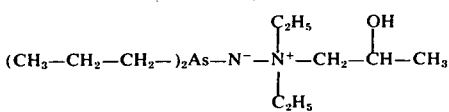

EXAMPLE 14

Using the procedure as described in Example 1, 1 mole of triethoxy antimony is reacted with 1 mole of dimethoxy hydrazine and 1 mole of n-decyl glycidyl ether. The reaction product is found to have the formula

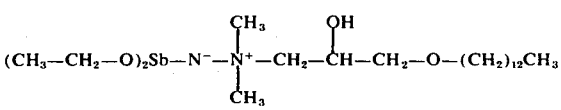

As indicated above, the compounds of the present invention can be used as coupling agents to bond fibers to elastomeric materials and thermosetting and/or thermoplastic resins. For this purpose, the compounds can be used in generally the same manner as conventional organosilicon coupling agents.

The term "glass fibers," as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

The coupling agents of the present invention can be simply formulated into an aqueous medium for application to the glass fibers to form a thin film coating on the fibers. However, it is frequently preferred to formulate the coupling agents of the invention in combination with a film-forming material or binder. A wide variety of film-forming binders can be used for this purpose and include polyester resins, polyamide resin, polyolefin resin (e.g., polyethylene, polypropylene, etc.), polyepoxide resins, vinyl resins (e.g., polyvinyl chloride, polyvinyl acetate, polyvinyl alcohol, polyvinyl pyrrolidone, etc.), waxes, partially dextrinized starch as well as numerous others. Such binders are themselves well known to those skilled in the art and are described in U.S. Pat. Nos. 2,931,739, 2,958,114, 3,040,413, 3,252,278, 3,424,608 and others. Combinations of two or more of the above film forming binders can also be used.

The size compositions can also be formulated to include any of a variety of wetting agents, glass fiber lubricants, etc., which are likewise known to the art. The size compositions can be formulated in aqueous media or in inert organic solvents, depending on the intended use of the treated glass fibers and the nature of the film-forming binder or binders employed.

Examples of such size compositions which can be employed in the treatment of glass fibers for use in the manufacture of glass fiber reinforced resins and elastomeric materials are represented by the following.

EXAMPLE 15

Size Composition

| | |
|---|---|
| Compound of Example 1 | 1.0 % by weight |
| Wetting agent (Nopcogen 16L) | 0.1 % by weight |
| Water | 98.9 % by weight |

EXAMPLE 16

Size Composition

| | |
|---|---|
| Compound of Example 2 | 1.0 % by weight |
| Polypropylene emulsion | 5.0 % by weight |
| Water | 94.0 % by weight |

EXAMPLE 17

Size Composition

| | |
|---|---|
| Compound of Example 9 | 1.1 % by weight |
| Epoxy resin (DER 330) | 7.0 % by weight |
| Diacetone alcohol | 91.9 % by weight |

EXAMPLE 18

Size Composition

| | |
|---|---|
| Compound of Example 3 | 1.0 % by weight |
| Polyester resin | 3.0 % by weight |
| Polyvinyl alcohol | 1.0 % by weight |
| Wetting agent | 0.1 % by weight |
| Water | 94.9 % by weight |

EXAMPLE 19

Size Composition

| | |
|---|---|
| Partially dextrinized starch | 8.0 % by weight |
| Hydrogenated vegetable oil | 1.5 % by weight |
| Wetting agent (Nopcogen 16L) | 0.5 % by weight |
| Compound of Example 11 | 1.0 % by weight |
| Water | 89.0 % by weight |

EXAMPLE 20

Size Composition

| | |
|---|---|
| Compound of Example 14 | 2.0 % by weight |
| Wetting agent (Nopcogen 16L) | 0.6 % by weight |
| Water | 97.4 % by weight |

In formulating size compositions with the coupling agents of the present invention, the coupling agent is generally employed in an amount constituting from 0.1 to 10% by weight of the composition, and the fiber-forming binder in an amount from 1 to 25% by weight of the composition. These amounts are not critical to the practice of the invention and can be varied as desired. The compositions of Examples 15 to 20 can be applied to glass fibers as they are formed, or afterwards, in accordance with conventional procedures.

Glass fibers coated with the silanes of the present invention can be incorporated in the form of fibers, yarns, rovings, fabrics and the like with resin materials, including epoxy resins, polyester resins, polyamide resins as well as numerous other thermoplastic and/or thermosetting plastics in amounts such that the treated glass fibers constitute from 1 to 20% by weight of the plastic laminate or coated fabric formed. The coating on the individual glass fibers, comprising as the essential component the silanes of the present invention, serves to provide a secure bonding relationship between the glass fiber surfaces and the resin.

Glass fibers sized with a composition embodying the silanes of the present invention can also be used in the manufacture of glass fiber-reinforced elastomeric products. In the preferred practice of this concept of the invention, the glass fibers which have been sized with one of the compositions of Examples 15 to 20 are formed into strands, yarns, cords formed of strands which are twisted and plied together or threads, hereinafter referred to as bundles, are subjected to impregnation with an aqueous composition formulated to include a resorcinol-aldehyde resin component and an elastomer component.

A wide variety of such impregnating compositions are well known to those skilled in the art and are described in U.S. Pat. Nos. 3,402,064, 3,424,608, 3,567,671, 3,591,357 and numerous others. This concept may be illustrated by way of the following examples.

EXAMPLE 21

Using the procedure described in U.S. pat. No. 3,567,671, an impregnating composition is formulated as follows:

| Impregnating Composition | |
|---|---|
| | Parts by weight (solids basis) |
| Resorcinol-formaldehyde resin (Penacolyte R 2170) | 5.0 |
| Vinyl pyridine-butadiene-styrene terpolymer (Gentac FS) | 30.0 |
| Vinyl chloride-vinylidene chloride copolymer (Dow Latex 874) | 20.0 |
| Microcrystalline paraffin wax | 6.0 |

Water constitutes the balance of the composition and is present in an amount sufficient to adjust the solids content of the composition to within the range of 20 to 55% solids by weight. The impregnation can be carried out in accordance with the procedure described in U.S. Pat. No. 3,424,608 whereby the solids of the impregnating composition serve to coat the fibers sized with one of the compositions of Examples 15 to 20 and serve to separate the fibers and protect the sized fibers from destruction by mutual abrasion.

EXAMPLE 22

Glass fibers sized with the composition of Example 16 are impregnated with the following impregnating composition of the type illustrated in Example 21 except that the vinyl chloride-vinylidene chloride copolymer component is replaced by a dicarboxylated butadiene-styrene resin.

| Impregnating Composition | |
|---|---|
| | Parts by weight (solids basis) |
| Resorcinol-formaldehyde resin | 5.0 |
| Vinyl pyridine-butadiene-styrene terpolymer | 30.0 |
| Dicarboxylated butadiene-styrene resin (Pliolite 2106 - Goodyear) | 20.0 |
| Microcrystalline paraffin wax | 6.0 |
| Water to solids content of 35% | |

Application of this impregnating composition can be made in an amount sufficient to deposit in the glass fiber bundle solids constituting from 15 to 40% by weight of the glass fiber system.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine; and EPDM rubbers as represented by butadiene polymers and copolymers with monoolefins such as butadiene-styrene-vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3 to 20 carbon atoms, such as propylene, and polyene, such as dicyclopentadiene, 1,4-hexadiene and preferably an alkylene or alkylidene norbornene, such as 5-alkylidene-2-norbornene and the like in which the alkylidene group numbers from 2 to 12 carbon atoms, and polysulfone rubbers.

In facilitating the combination of glass fibers treated in accordance with the present invention with elastomeric materials, the individual glass fibers containing a coating on the surfaces thereof from Examples 15 to 20 are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

1. Glass fibers having a thin size coating thereon, said coating being formed from a compound having the formula

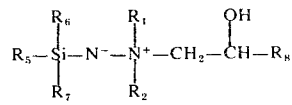

wherein $R_1$ and $R_2$ are each alkyl containing 1 to 6 carbon atoms; $R_5$ is selected from the group consisting of alkyl, aryl, cycloalkyl, alkenyl and acryloxyalkyl and methacryloxyalkyl, $R_5$ containing 1 to 20 carbon atoms; $R_6$ and $R_7$ are each selected from the group consisting of alkoxy containing 1 to 5 carbon atoms, $R_5$ and hydrogen; and $R_8$ is selected from the group consisting of hydrogen, alkyl containing 1 to 8 carbon atoms and a group of the formula

wherein $R_4$ is selected from the group consisting of phenyl; phenyl substituted with an amino group, a halogen group or an alkyl group; alkyl containing 1 to 20 carbon atoms; alkenyl containing 2 to 8 carbon atoms and a group of the formula

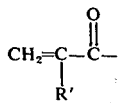

where R' is hydrogen or methyl.

2. Glass fibers as defined in claim 1 wherein the compound has the formula

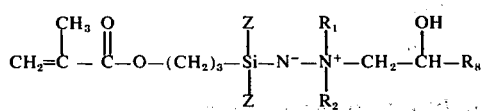

wherein Z is alkoxy of 1 to 5 carbon atoms.

3. Glass fibers as defined in claim 1 wherein the compound has the formula

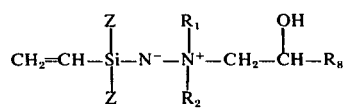

wherein Z is alkoxy of 1 to 5 carbon atoms.

4. Glass fibers as defined in claim 1 wherein the coating also includes a film forming material.

5. A glass fiber bundle formed of a plurality of glass fibers, each of the glass fibers having a thin size coating thereon, said coating formed from a compound having the formula

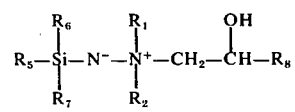

wherein $R_1$ and $R_2$ are each alkyl containing 1 to 6 carbon atoms; $R_5$ is selected from the group consisting of alkyl, aryl, cycloalkyl, alkenyl and acryloxyalkyl and methacryloxyalkyl, $R_5$ containing 1 to 20 carbon atoms; $R_6$ and $R_7$ are each selected from the group consisting of alkoxy containing 1 to 5 carbon atoms, $R_5$ and hydrogen; and $R_8$ is selected from the group consisting of hydrogen, alkyl containing 1 to 8 carbon atoms and a group of the formula

wherein $R_4$ is selected from the group consisting of phenyl; phenyl substituted with an amino group, a halogen group or an alkyl group; alkyl containing 1 to 20 carbon atoms; alkenyl containing 2 to 8 carbon atoms and a group of the formula

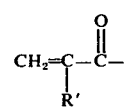

where R' is hydrogen or methyl.

6. A bundle as defined in claim 5 wherein the coating also includes a film forming material.

7. A bundle as defined in claim 5 wherein the compound has the formula

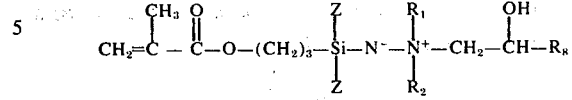

wherein Z is alkoxy of 1 to 5 carbon atoms.

8. A bundle as defined in claim 5 wherein the compound has the formula

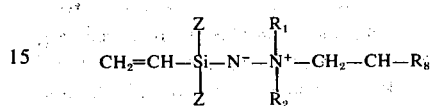

wherein Z is alkoxy of 1 to 5 carbon atoms.

9. A bundle as defined in claim 5 wherein the glass fibers forming the bundle are in the form of strands.

10. A bundle as defined in claim 5 wherein the glass fibers forming the bundle are in the form of strands which have been plied and twisted together.

11. In a glass fiber reinforced elastomeric product wherein an elastomeric material constitutes a continuous phase in which the glass fibers are distributed, the improvement in the bonding relationship between the glass fibers and the elastomeric material comprising a coating on the glass fibers, said coating formed from a compound having the formula

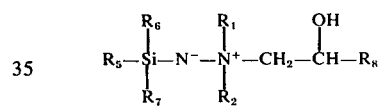

wherein $R_1$ and $R_2$ are each alkyl containing 1 to 6 carbon atoms; $R_5$ is selected from the group consisting of alkyl, aryl, cycloalkyl, alkenyl and acryloxyalkyl and methacryloxyalkyl, $R_5$ containing 1 to 20 carbon atoms; $R_6$ and $R_7$ are each selected from the group consisting of alkoxy containing 1 to 5 carbon atoms, $R_5$ and hydrogen; and $R_8$ is selected from the group consisting of hydrogen, alkyl containing 1 to 5 carbon atoms and a group of the formula

wherein $R_4$ is selected from the group consisting of phenyl; phenyl substituted with an amino group, a halogen group or an alkyl group; alkyl containing 1 to 20 carbon atoms; alkenyl containing 2 to 8 carbon atoms and a group of the formula

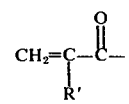

where R' is hydrogen or methyl.

12. A product as defined in claim 11 wherein the glass fibers are in the form of bundles, with the compound forming a coating on the individual glass fibers and an impregnant in the bundle, said impregnant comprising a blend of an elastomer and a resorcinol-aldehyde resin.

13. In a glass fiber reinforced plastic product wherein a thermosetting or thermoplastic resin constitutes a continuous phase in which the glass fibers are distributed, the improvement in the bonding relationship between the glass fibers and the resin comprising a coating on the glass fibers, said coating formed from a compound having the formula

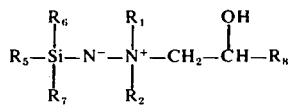

wherein $R_1$ and $R_2$ are each alkyl containing 1 to 6 carbon atoms; $R_5$ is selected from the group consisting of alkyl, aryl, cycloalkyl, alkenyl and acryloxyalkyl and methacryloxyalkyl, $R_5$ containing 1 to 20 carbon atoms; $R_6$ and $R_7$ are each selected from the group consisting of alkoxy containing 1 to 5 carbon atoms, $R_5$ and hydrogen; and $R_8$ is selected from the group consisting of hydrogen, alkyl containing 1 to 8 carbon atoms and a group of the formula $$-CH_2-O-R_4$$

wherein $R_4$ is selected from the group consisting of phenyl; phenyl substituted with an amino group, a halogen group or an alkyl group; alkyl containing 1 to 20 carbon atoms; alkenyl containing 2 to 8 carbon atoms and a group of the formula

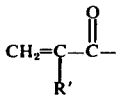

where R' is hydrogen or methyl.

* * * * *